United States Patent [19]
Fujiu et al.

[11] Patent Number: 5,824,348
[45] Date of Patent: Oct. 20, 1998

[54] APPARATUS FOR MANUFACTURING A STEERING SHAFT

[75] Inventors: Isao Fujiu; Mitsuo Yabutsuka, both of Kiryu, Japan

[73] Assignee: Kabushiki Kaisha Yamada Seisakusho, Gunma-ken, Japan

[21] Appl. No.: 783,907

[22] Filed: Jan. 16, 1997

Related U.S. Application Data

[62] Division of Ser. No. 350,182, Nov. 30, 1994, Pat. No. 5,640,884.

[30] Foreign Application Priority Data

Dec. 3, 1993 [JP] Japan .................................. 5-338971

[51] Int. Cl.$^6$ .................................................. B29C 45/14
[52] U.S. Cl. ........................ 425/120; 425/117; 425/123; 264/262; 264/275; 264/279
[58] Field of Search .................................. 425/127, 117, 425/125, 542, 568, 129.1, 120, 123; 264/262, 263, 275, 279; 249/83

[56] References Cited

U.S. PATENT DOCUMENTS

| 3,434,367 | 3/1969 | Renneker et al. ................. 280/777 X |
| 3,482,007 | 12/1969 | Routh ..................................... 264/262 |
| 3,597,994 | 8/1971 | Shiomi ..................................... 74/492 |
| 3,608,049 | 9/1971 | Tavella ................................... 264/262 |
| 3,612,223 | 10/1971 | Shiomi ................................. 74/492 X |
| 4,153,656 | 5/1979 | Bunyan ................................... 264/262 |
| 4,325,904 | 4/1982 | Frankhouse ............................. 264/262 |
| 4,337,967 | 7/1982 | Yoshida et al. ......................... 280/777 |
| 4,385,025 | 5/1983 | Salerno et al. ......................... 264/262 |
| 4,411,167 | 10/1983 | Mohr ........................................ 74/492 |
| 4,867,003 | 9/1989 | Beauch et al. ............................ 74/492 |
| 4,985,191 | 1/1991 | Hannon ................................ 425/129.1 |
| 5,228,720 | 7/1993 | Sato et al. .............................. 280/777 |
| 5,238,615 | 8/1993 | Stoor ...................................... 264/262 |
| 5,348,345 | 9/1994 | Dykema et al. ........................ 280/777 |

FOREIGN PATENT DOCUMENTS

| 2561605 | 9/1985 | France . |
| 1630376 | 8/1975 | Germany . |
| 46-18325 | 5/1971 | Japan . |

Primary Examiner—Khanh P. Nguyen
Attorney, Agent, or Firm—Lowe Hauptman Gopstein Gilman & Berner

[57] ABSTRACT

A mold for manufacturing a steering shaft formed with inner and outer shafts which are telescopically contractible on impact is disclosed. The mold includes an outer shaft supporting mold portion and an inner shaft supporting mold portion that respectively receive the outer and inner shafts in a telescoped position. A first molten resin injection guide portion formed in the outer shaft supporting mold is located in alignment with a hole formed in the outer shaft and a circumferential groove formed in the inner shaft to enable injection of resin through the hole into the groove. A second molten resin injection guide portion communicates with a first opening formed between the outer and inner shafts to enable injection of resin material into this opening to fix the shafts in concentric alignment with each other.

8 Claims, 10 Drawing Sheets

PRIOR ART

APPARATUS FOR MANUFACTURING A STEERING SHAFT

This application is a division of application Ser. No. 08/350,182 filed Nov. 30, 1994 now U.S. Pat. No. 5,640,884.

BACKGROUND OF THE INVENTION

1. Field of the Invention

The present invention relates to a steering shaft in which a resin-coated layer is formed in a sliding portion and which has a sliding coupling for permitting smooth sliding, and to an apparatus for manufacturing the same.

2. Description of the Related Art

Figure 15:
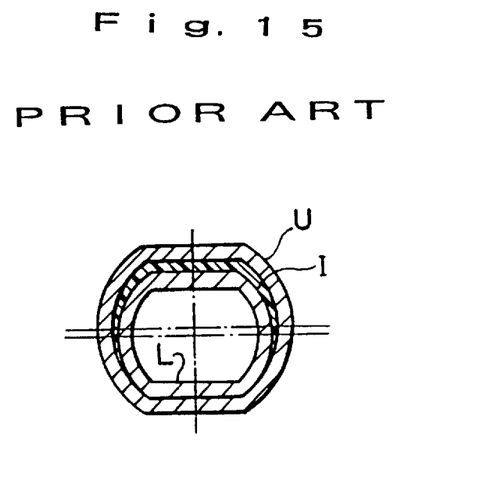
FIG. 15 is a cross-sectional view of an injection-molded portion of a conventional steering wheel.

Conventionally, as shown in FIG. 15, a steering shaft is structured so that an axial end portion of an upper shaft U is fitted over an axial end portion of a lower shaft L by adopting a splined structure or an oval, straight-sided cross-sectional structure to form a fitted coupling section so as to allow the upper shaft U to be slidable in the axial direction, and that two injection-molded portions I formed of a synthetic resin are provided between the upper shaft U and the lower shaft U, respectively at an appropriate distance from each end of the fitted coupling section. The injection-molded portions I serve to prevent a clearance in the fitted coupling section of the steering shaft so as to allow the steering shaft of a steering system to be telescopically contractable to secure the safety of the driver during a collision of the vehicle.

A gap is provided in the fitted coupling section between the lower shaft L and the upper shaft U so that the upper shaft U can be readily positioned or to be movable relative to the lower shaft L. When the lower shaft L and the upper shaft U are fitted, coupled, and fixed to each other by the injection-molded portions I, the injection-molded portions I must be so provided that their axes are concentrically aligned with each other as practically as possible.

Discharge ports (air vents) are provided in rear surface portions of the upper shaft U (i.e., an outer shaft) in such a manner as to diametrically oppose respectively injection ports and form pairs therewith, which oppose injection ports, so as to ensure that a molten synthetic resin, which is cured to form the injection-molded portions I, may be filled sufficiently in forming grooves formed in the lower shaft L (i.e., an inner shaft). For this reason, there are cases where the lower shaft L is pushed in one direction by the injecting pressure of the molten resin acting in the same direction, so that the lower shaft L is offset within the upper shaft U, and the two shafts are fitted, coupled, and fixed to each other with the axes of the two shafts offset. In such a case, when a load in a bending direction acts on the steering shaft during a collision of the vehicle, there is the possibility of the contracting movement of the steering shaft becoming dull depending on the direction.

SUMMARY OF THE INVENTION

Accordingly, an object of the present invention is to provide a steering shaft capable of undergoing stable and smooth contracting movement, thereby overcoming the above-described drawbacks of the conventional art.

Another object of the present invention is to provide a mold for manufacturing a steering wheel which makes it possible to manufacture a steering wheel capable of undergoing stable and smooth contracting movement.

In accordance with the present invention, there is provided an apparatus for manufacturing the steering shaft. The apparatus comprises a mold including an outer shaft supporting mold portion to accommodate an outer shaft of the steering shaft, and an inner shaft supporting mold portion to accommodate an inner shaft of the steering shaft. The outer shaft supporting mold portion includes a first molten resin injection guide portion for positioning in alignment with a hole formed in the outer shaft in a circumferential groove in the inner shaft to enable injection of resin through the hole into the groove. The inner shaft supporting mold portion includes a second molten resin injection guide portion communicating with a first opening formed between the outer shaft and the inner shaft.

In the preferred embodiment, the outer shaft supporting mold portion includes an annular stop surface against which one end of the outer shaft is positionable to align the first molten resin injection guide portion with the hole in the outer shaft. This alignment also locates the second molten resin injection guide portion in communication with the first opening.

The above and other objects, features and advantages of the present invention will become more apparent from the following detailed description of the invention when read in conjunction with the accompanying drawings.

DESCRIPTION OF THE PREFERRED EMBODIMENTS

Figure 1:
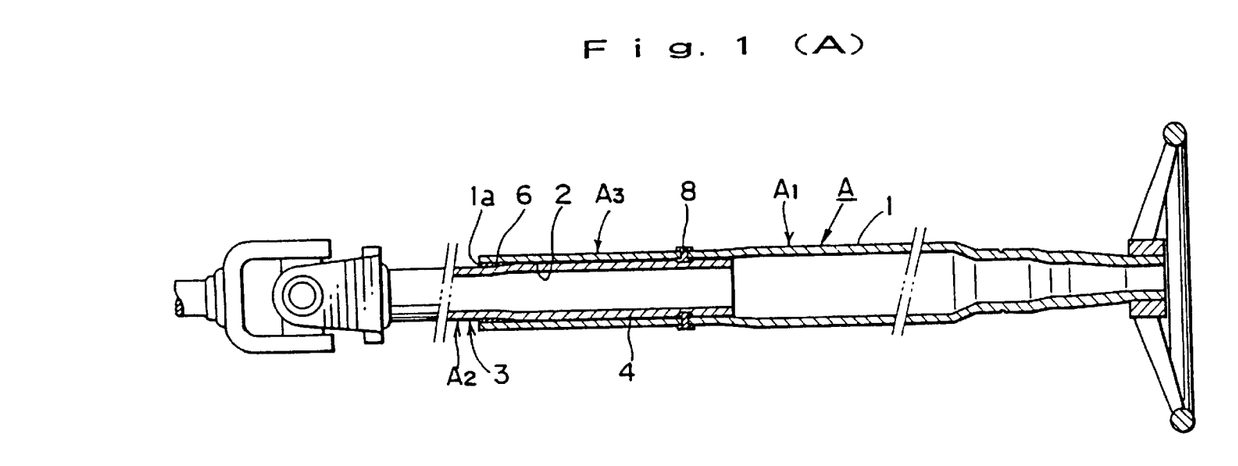
FIG. 1(A) is a side elevational view, partly in section, of a steering shaft in accordance with the present invention.
FIG. 1(B) is a side elevational view, partly in section, of a coupling and sliding section of the steering shaft.

Referring now to the accompanying drawings, a description will be given of the embodiments of the present invention. As shown in FIG. 1(A), a steering shaft A is comprised of an outer shaft $A_1$ and an inner shaft $A_2$. The outer shaft $A_1$ is coupled to and fitted over the inner shaft $A_2$ in such a manner as to be telescopically retractable in its axial direction in sliding contact therewith, thereby forming a coupling and sliding section $A_3$. The coupling and sliding section $A_3$ undergoes a sliding operation only during the receipt of an impact, and absorbs the impact as the steering shaft A is shrunk in its axial direction when a vehicle undergoes a collision.

Figure 3:
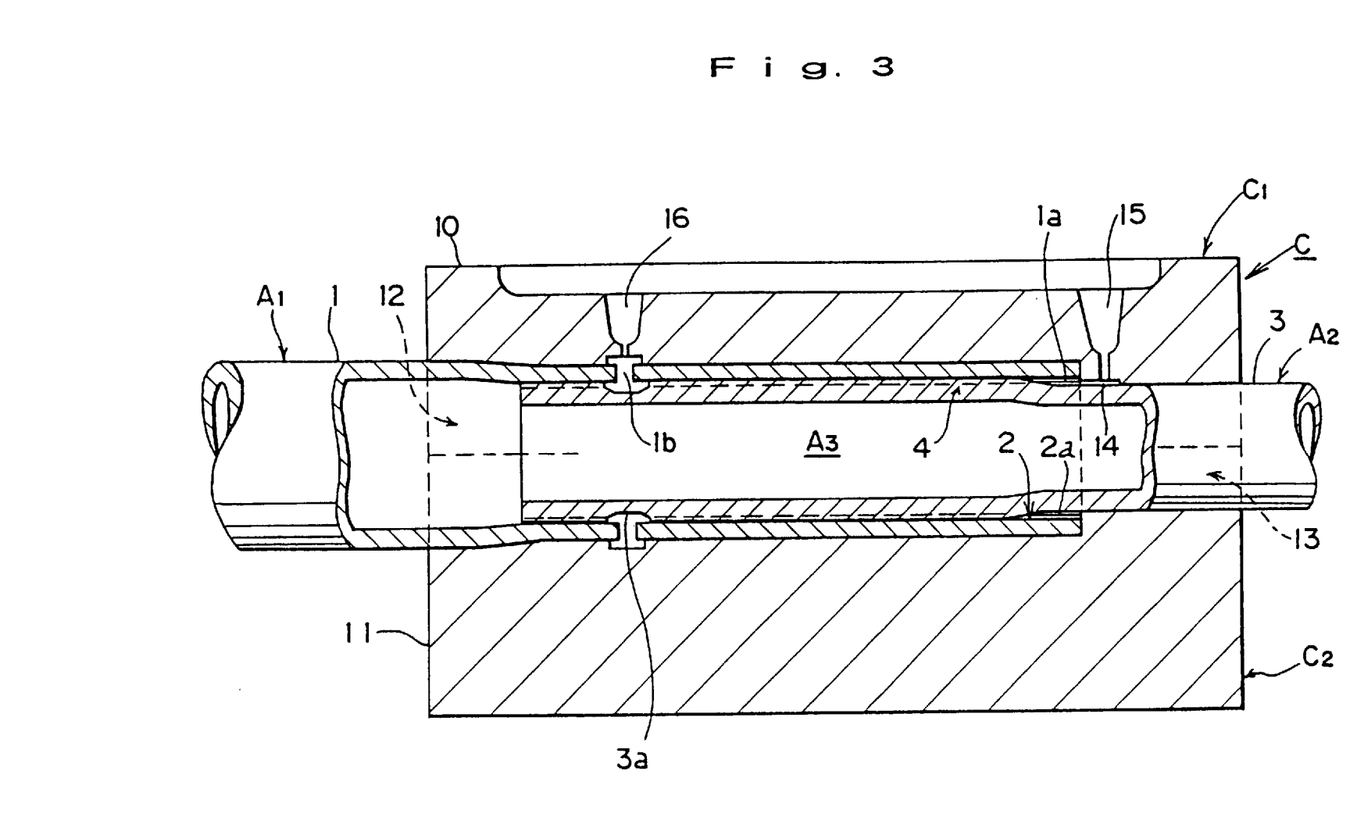
FIG. 3 is a cross-sectional view illustrating a state in which the coupling and sliding section is clamped by the injecting mold half and the supporting mold half.

A sliding portion 2 is formed on an inner peripheral surface of the coupling and sliding section $A_3$ of the outer shaft $A_1$, i.e., on an inner peripheral surface of an end portion of an outer shaft body 1. Meanwhile, a slid portion 2 is formed on an outer peripheral surface of the inner shaft $A_2$, i.e., on an outer peripheral surface of an end portion of an inner shaft body 3. Specifically, splines are used for the sliding portion 2 and the slid portion 4, and sliding splines 2a and slid splines 4a engage each other, as shown in FIG. 3.

Figure 10:
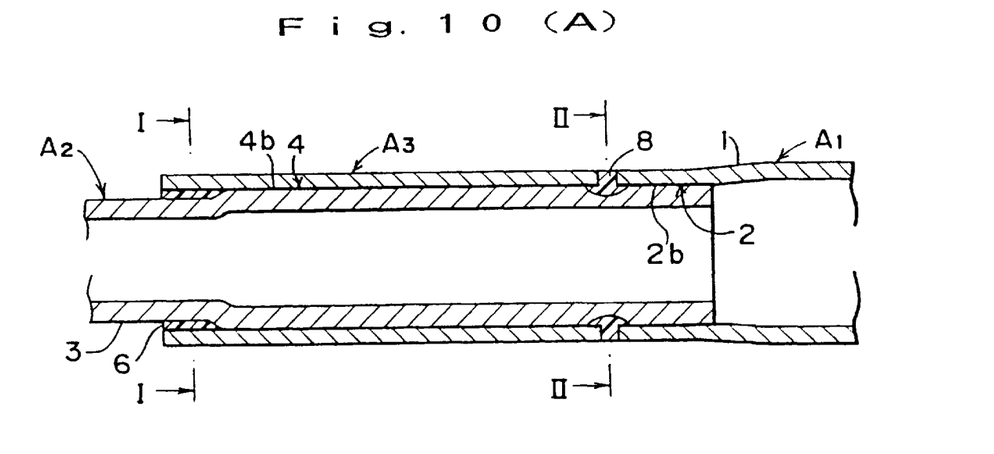
FIG. 10(A) is a cross-sectional view of another example of the coupling and sliding section.
FIG. 10(B) is a cross-sectional view taken in the direction of arrows along line I—I of FIG. 10(A)
FIG. 10C is a cross-sectional view taken in the direction of arrows along line II—II of FIG. 10(A)

In practice, the steering shaft A is comprised of an upper shaft and a lower shaft, and, in the embodiment shown in FIGS. 1(A) and 1(B), the outer shaft $A_1$ is used as the upper shaft, while the inner shaft $A_2$ is used as the lower shaft. The arrangement provided is such that the inner shaft $A_2$ does not rotatively slip in the outer shaft $A_1$, and the outer shaft $A_1$ and the inner shaft $A_2$ always rotate integrally. As another example of each of the sliding portion 2 and the slid portion 4, not a circular shape but an oval, straight-sided shape in cross section may be used. For instance, the sliding portion 2 and the slid portion 4 may be constituted by an oval, straight-sided sliding portion 2b and an oval, straight-sided slid portion 4b, as shown in FIGS. 10(A) to 10(C). In addition, polygonal shapes, such as a hexagonal shape, or a substantially elliptical shape may be alternatively used.

The steering shaft A constituted by the outer shaft $A_1$ and the inner shaft $A_2$ telescopically contracts during the receipt of an impact, and a resin material 5 is filled between the sliding portion 2 and the slid portion 4, thereby forming a sliding resin portion 6 (see FIG. 1B). Specifically, the resin material 5 is filled between the sliding portion 2 on an opening 1a side of the outer shaft $A_1$ and an end portion of the slid portion 4 of the inner shaft $A_2$, and constitutes a fixing support by means of frictional resistance. When an impact of a fixed level or more is applied to the steering shaft A, and the steering shaft A contracts in the axial direction, even if the inner shaft $A_2$ is slightly bent with respect to the axial direction of the outer shaft $A_1$, the sliding resin portion 6 allows the outer shaft $A_1$ to slide smoothly in the axial direction, and makes it possible to prevent the inner shaft $A_2$ from biting at the outer shaft $A_1$.

Figure 2:
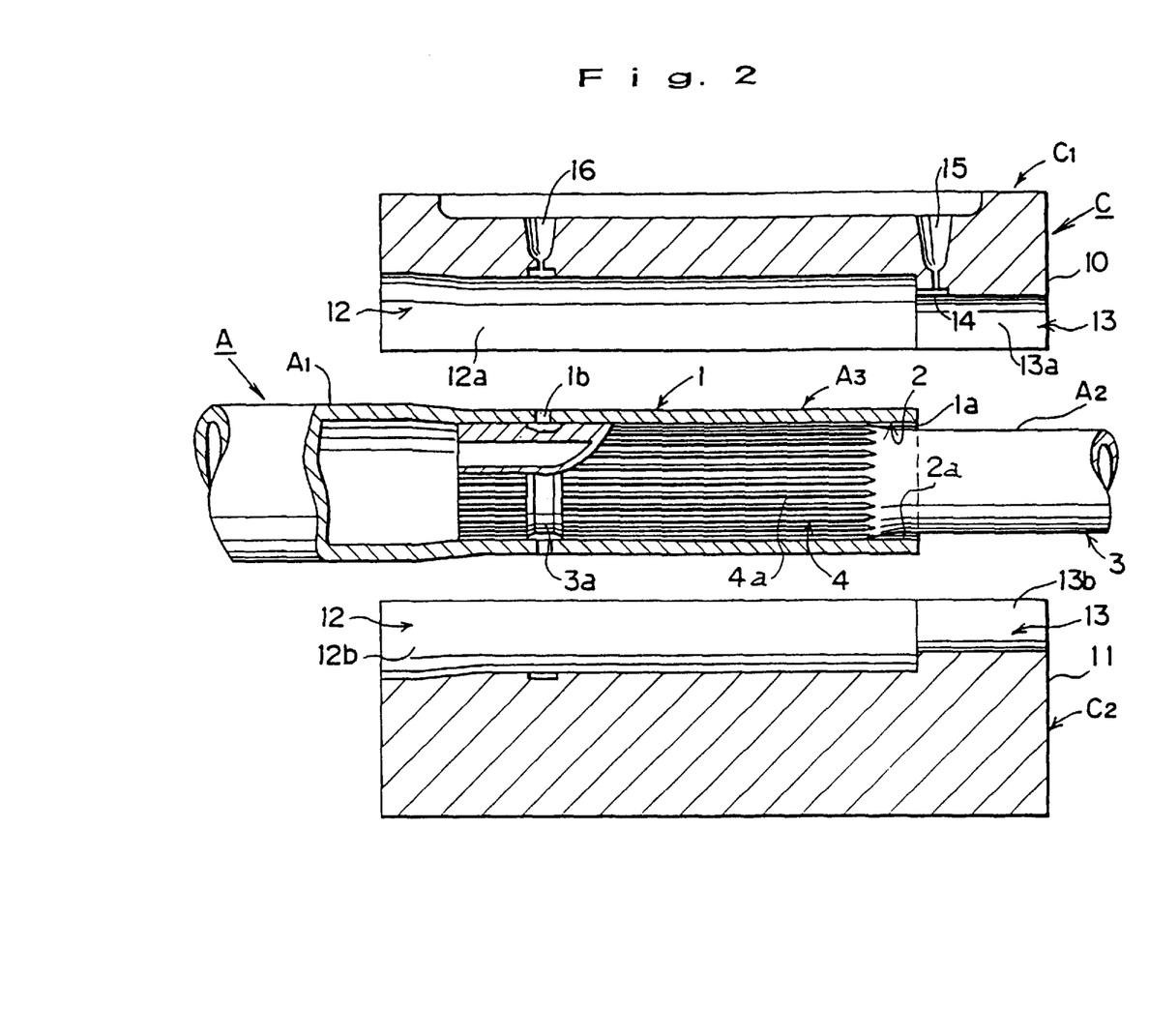
FIG. 2 is a vertical side elevational view illustrating an injecting mold half and a supporting mold half of a mold for molding the steering shaft.

Furthermore, as shown in FIGS. 1B and 2, a fixing annular groove 3a is formed on a peripheral surface of the slid portion 4 on an axially opposite side of the coupling and sliding section $A_3$ to the portion where the sliding resin portion 6 is formed with an appropriate interval therebetween. A fixing resin portion 8 (see FIG. 1B) having the function of a shear pin is formed in the fixing annular groove 3a by a fixing resin material 7 which is injected through an injection port 1b in the outer shaft $A_1$. By means of the fixing resin portion 8, the coupling and sliding section $A_3$ of the steering shaft A does not undergo the sliding operation until an impact of a fixed level or more is applied thereto.

Next, a description will be given of a method of forming the coupling and sliding section $A_3$ of the steering shaft A. As shown in FIG. 2, a mold C is comprised of an injecting mold half $C_1$ and a supporting mold half $C_2$. The steering shaft A constituted by the outer shaft $A_1$ and the inner shaft $A_2$ is disposed between the injecting mold half $C_1$ and the supporting mold half $C_2$. At this time, the sliding portion 2 of the outer shaft $A_1$ and the slid portion 4 of the inner shaft $A_2$ are slidably coupled to each other.

As shown in FIGS. 2 and 3, the mold C is provided with outer shaft accommodating portions (also called outer shaft supporting mold portions) 12 for accommodating the outer shaft $A_1$ of the steering shaft A and inner shaft accommodating portions (or inner shaft supporting mold portions) 13 for accommodating the inner shaft $A_2$. A molten-resin injection guide portion 14 communicating with the opening 1a of the outer shaft $A_1$ is formed in the inner shaft accommodating portion 13 of the injecting mold half $C_1$.

The outer shaft accommodating portions 12 and the inner shaft accommodating portions 13 are formed in both the injecting mold half $C_1$ and the supporting mold half $C_2$. An injecting-side outer shaft accommodating portion 12a and an injecting-side inner shaft accommodating portion 13a are formed in an injecting mold body 10 on the injecting mold half $C_1$ side, while a supporting-side outer shaft accommodating portion 12b and a supporting-side inner shaft accommodating portion 13b are formed in a supporting mold body 11 on the supporting mold half $C_2$ side (see FIG. 2).

Figure 4:
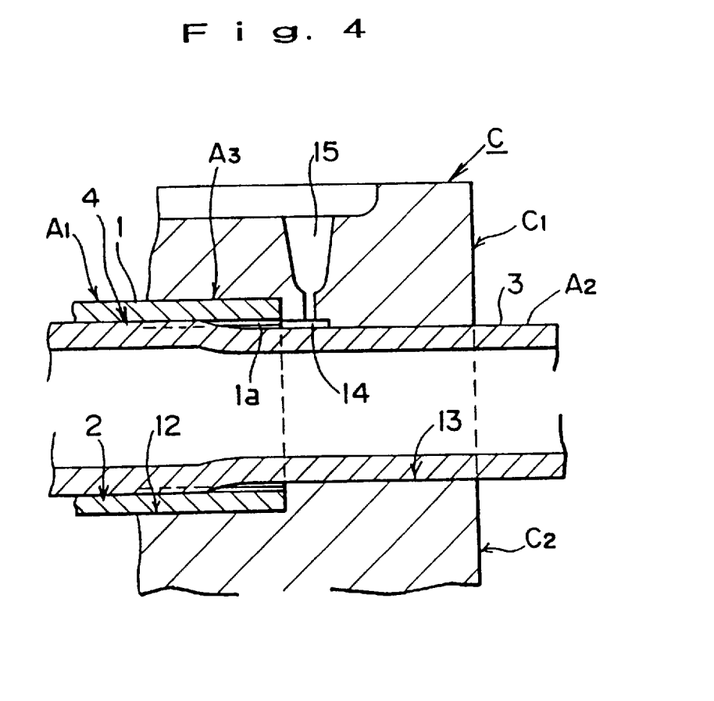
FIG. 4 is a cross-sectional view illustrating a state in which a molten-resin injection guide portion communicates with an opening of an outer shaft.
Figure 5:
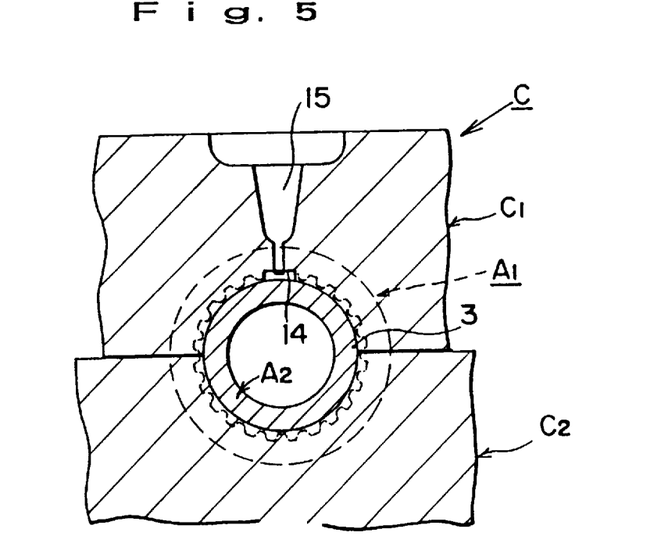
FIG. 5 is a front vertical cross-sectional view of the injecting mold half, the supporting mold half, and an inner shaft.
Figure 6:
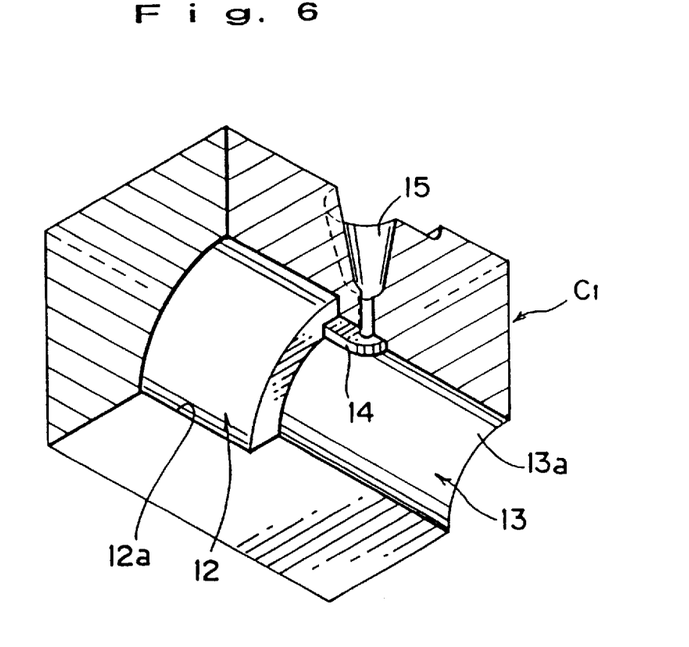
FIG. 6 is a perspective view of the injecting mold half.

The outer shaft accommodating portion 12 and the inner shaft accommodating portion 13 are distinguished from each other by a stepped portion where the diameter of the shaft changes (see FIGS. 2 and 6). As shown in FIGS. 3 to 5, the molten-resin injection guide portion 14 is formed in the injecting-side inner shaft accommodating portion 13a of the injecting mold half $C_1$, and the molten-resin injection guide portion 14 communicates with a molten-resin injection guide port 15.

Figure 7:
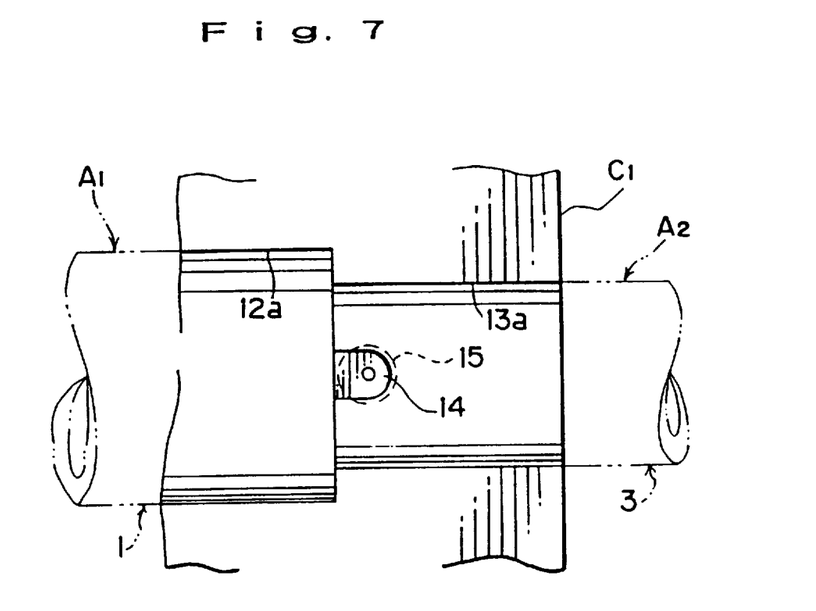
FIG. 7 is a plan view of the injecting mold half.
Figure 8:
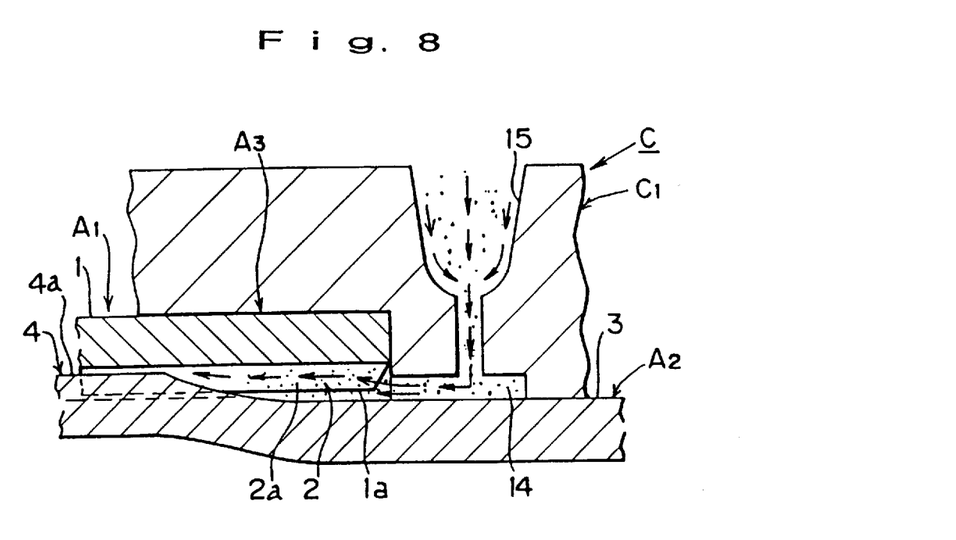
FIG. 8 is an enlarged view illustrating a state in which the molten-resin injection guide portion communicates with the opening of the outer shaft.

The molten-resin injection guide port 15 is used to inject a molten resin material from outside the injecting mold half $C_1$. The molten-resin injection guide port 15 is structured such that, when the steering shaft A is accommodated in the mold C, the molten-resin injection guide port 15 communicates with the opening 1a of the outer shaft $A_1$, as shown in FIGS. 4, 7, and 8. When the molten resin material is injected through the molten-resin injection guide port 15, the molten resin material passes through the molten-resin injection guide portion 14, and enters the interior of the opening 1a of the outer shaft $A_1$ on the inner peripheral side thereof. A molten-resin injection guide port 16 for injecting the molten resin material which becomes the fixing resin material 7 is formed in the injecting mold half $C_1$.

The molten resin material which flows along the molten-resin injection guide portion 14 and into a gap between the outer shaft $A_1$ and the inner shaft $A_2$ through the opening 1a of the outer shaft $A_1$, as shown in FIG. 8, advances in such a manner as to fill the gap between the outer shaft $A_1$ and the inner shaft $A_2$.

Figure 9:
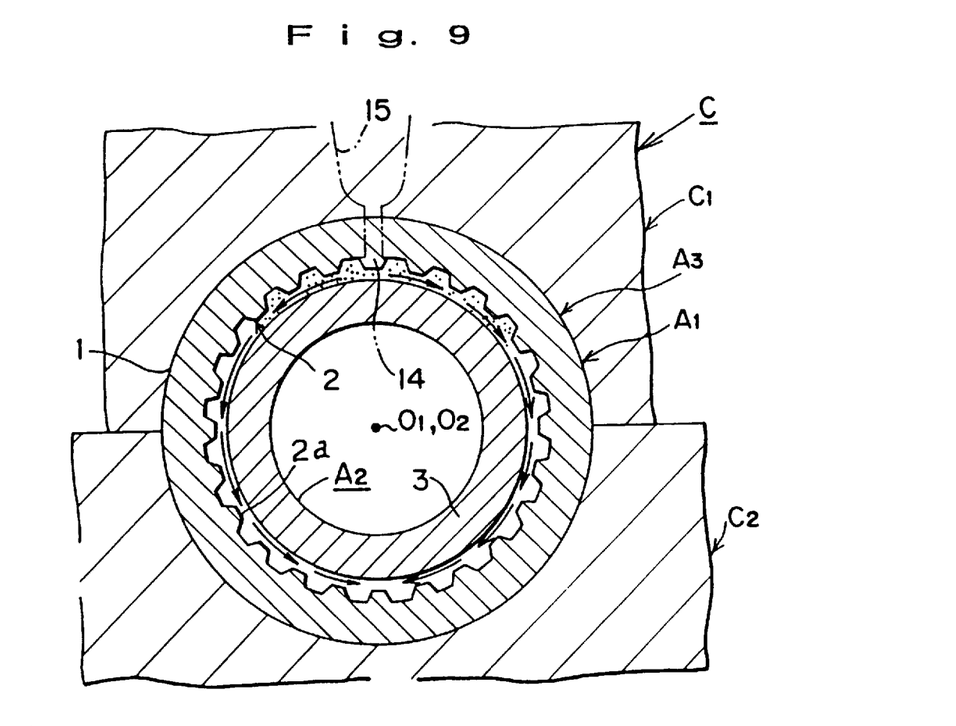
FIG. 9 is an enlarged front vertical cross-sectional view of the injecting mold half, the supporting mold half, and the inner shaft.

At this time, as shown in FIG. 9, the coupling and sliding section $A_3$ of the outer shaft $A_1$ and the inner shaft $A_2$ is fixed by the injecting mold half $C_1$ and the supporting mold half $C_2$, so that the center $O_2$ of the inner shaft $A_2$ and the center $O_1$ of the outer shaft $A_1$ are aligned with each other (or substantially aligned with each other). For this reason, the inner shaft $A_2$ can be supported concentrically within the outer shaft $A_1$.

Next, a description will be given of another embodiment of the present invention.

In the embodiment shown in FIGS. 11(A) and 11(B), an annular groove $1c$ is provided in the inner peripheral surface of the outer shaft $A_1$ on the opening $1a$ side in an area where the resin material 5 is filled. This groove $1c$ is also filled with the resin material 5, thereby forming an annular holding projection $5a$. In the arrangement in which this annular holding projection $5a$ is provided, the sliding resin portion 6, which is formed by injecting the resin material 5 between the slid portion 4 of the inner shaft $A_2$ and the sliding portion 2 of the outer shaft $A_1$ through the open end of the outer shaft $A_1$, is held between the shafts and is prevented from coming off, and the sliding characteristic of the outer shaft $A_1$ is improved.

Figure 11:
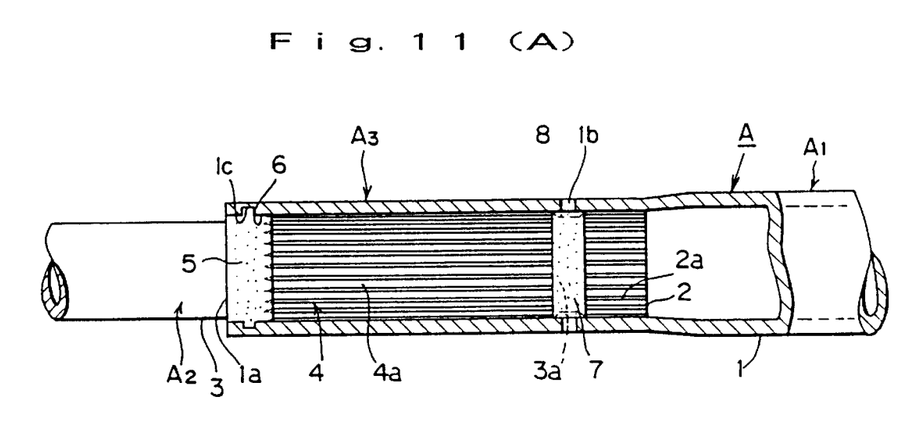
FIG. 11(A) is a partially cross-sectional view of the coupling and sliding section in accordance with another embodiment.
FIG. 11(B) is an enlarged cross-sectional view of the opening of the outer shaft, shown in FIG. 11(A), and its vicinity.
Figure 12:
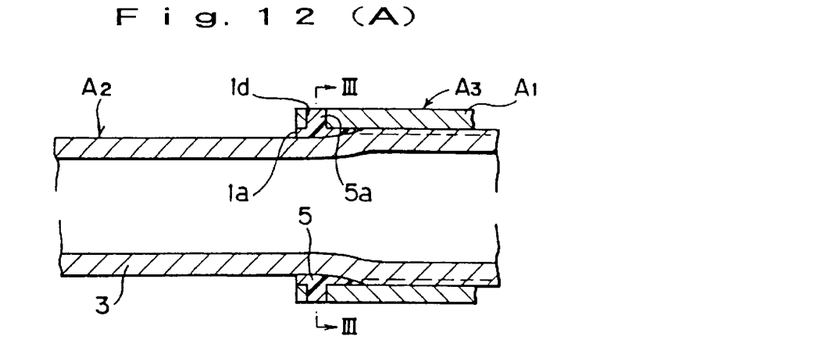
FIG. 12(A) is a cross-sectional view, similar to FIG. 11(B), of a modification of the embodiment shown in FIGS. 11(A) and 11(B)
FIG. 12(B) is a cross-sectional view taken in the direction of arrows along line III—III of FIG. 12(A)

FIGS. 12(A) and 12(B) show a modification of the embodiment shown in FIG. 11. In this modification, instead of providing the annular groove $1c$, a pair of holding projectings $5a$ are formed by forming a pair of through holes $1d$ in the outer shaft $A_1$ on diametrically opposite sides thereof and by filling the through holes $1d$ with the resin material 5. This makes it possible to more effectively prevent the sliding resin portion 6 from coming off.

Figure 13:
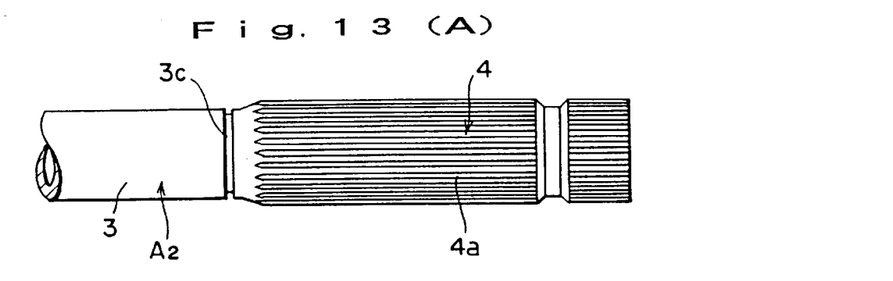
FIG. 13A is a side elevational view of the inner shaft in accordance with still another embodiment.
FIG. 13(B) is a cross-sectional view of the embodiment using the inner shaft shown in FIG. 13(A)

FIGS. 13(A) and 13(B) show still another embodiment in which an annular groove $3c$ is formed in an inner peripheral surface of the inner shaft $A_2$, and the groove $3c$ is filled with the resin material 5, thereby forming an annular holding projection $5a$. In this embodiment, the sliding resin portion 6 is also prevented from coming off, and the annular holding projection $5a$ is sheared during sliding so as to secure the sliding characteristic between the shafts.

Figure 14:
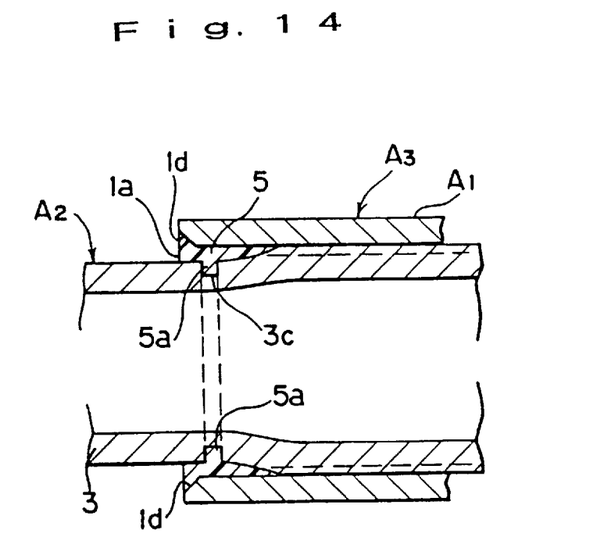
FIG. 14 is a cross-sectional view illustrating a modification of the embodiment shown in FIGS. 13(A) and 13(B)

FIG. 14 is a modification of the embodiment shown in FIGS. 13A and 13B. In this modification, an enlarged-inside-diameter portion $1d$ is further provided at the opening $1a$ end of the outer shaft $A_1$, and the enlarged-inside-diameter portion $1d$ is also filled with the resin material 5. In this case, when the inner shaft $A_2$ slides, the sliding resin portion 6 formed by the resin material 5 is easily caught at the end of the outer shaft $A_1$, so that the outer shaft $A_1$ is capable of sliding while holding the sliding resin portion 6. Incidentally, it goes without saying that, in FIGS. 13(A), 13(B), and 14, it is possible to use holes instead of the annular groove $3c$. In addition, the groove $3c$ may not be provided over the entire periphery and may be provided partially.

As described above, in the present invention, the steering shaft is structured such that, in the steering shaft A which is telescopically contractable in the axial direction, the sliding resin portion 6 is formed by injecting the resin material 5 between the slid portion 4 of the inner shaft $A_2$ and the sliding portion 2 of the outer shaft $A_1$ through the opening $1a$ of the outer shaft $A_1$ in the coupling and sliding section $A_3$ of the outer shaft $A_1$ and the inner shaft $A_2$. Accordingly, various advantages are offered. First, the axial movement of the outer shaft $A_1$ relative to the inner shaft $A_2$ in the coupling and sliding section $A_3$ can be made stable and smooth. Second, even when a force in the bending direction has acted on the inner shaft during a collision, the movement of the outer shaft can be guided in the axial direction to ensure a stable operation. Third, the coupling and sliding section $A_3$ can be guided and supported stably and firmly.

To give a more detailed description of the above advantages, in a first arrangement of the steering wheel in accordance with the present invention, the sliding resin portion 6 is formed in the coupling and sliding section $A_3$ by injecting the resin material 5 between the slid portion 4 of the inner shaft $A_2$ and the sliding portion 2 of the outer shaft $A_1$ through the opening $1a$ of the outer shaft $A_1$. If the resin material 5 is thus injected through the opening $1a$ of the outer shaft $A_1$, the molten resin material 5 advances substantially uniformly on the inner peripheral side of the outer shaft $A_1$ and is then cured, so that the inner shaft $A_2$ can be maintained and fixed concentrically with the outer shaft $A_1$.

For this reason, the axial movement of the outer shaft $A_1$ relative to the inner shaft $A_2$ in the coupling and sliding section $A_3$ is stable and smooth. In particular, since the molten resin material 5 which flows through the opening $1a$ side of the outer shaft $A_1$ is formed as the sliding resin portion 6, the sliding resin portion 6 is capable of preventing the inner shaft $A_2$ from biting at the outer shaft $A_1$.

In another arrangement, the coupling and sliding section $A_3$ of the outer shaft $A_1$ and th inner shaft $A_2$ in the steering shaft A which is telescopically contractable in the axial direction during receipt of an impact, the sliding resin portion 6 is formed by injecting the resin material 5 between the slid portion 4 of the inner shaft $A_2$ and the sliding portion 2 of the outer shaft $A_1$ through the opening $1a$ of the outer shaft $A_1$, and the fixing resin portion 8 is formed on an axially opposite side of the coupling and sliding section $A_3$ to the position where the sliding resin portion 6 is formed, at an appropriate interval therebetween. Consequently, since the fixing resin portion 8 is formed at an appropriate interval from the sliding resin portion 6, it is possible to improve the durability until an impact of a fixed level acts on the coupling and sliding section $A_3$, and to prevent an erroneous operation. The other advantages of this arrangement are similar to those of the first arrangement described above.

In still another arrangement, the steering wheel is arranged such that the sliding portion 2 and the slid portion 4 of the coupling and sliding section $A_3$ are provided with a splined structure. Since the sliding portion 2 and the slid portion 4 have the splined structure, the fitting accuracy improves, and the telescopic action can be made smooth. The other advantages of this arrangement are similar to those of the first arrangement described above.

In a further arrangement, the sliding portion 2 of the outer shaft $A_1$ and the slid portion 4 of the inner shaft $A_2$ in the coupling and sliding section $A_3$ are provided with noncircular cross sections, respectively. Since the outer shaft $A_1$ and the inner shaft $A_2$ in the coupling and sliding section $A_3$ are made noncircular in their cross sections, the structures of the sliding portion 2 and the slid portion 4 of the coupling and sliding section $A_3$ can be made very simple. At the same time, their telescopic action can be secured by the resin material 5. The other advantages of this arrangement are similar to those of the first arrangement described above.

In addition, the apparatus for manufacturing a steering shaft comprises: the mold C provided with the outer shaft accommodating portion 12 for accommodating the outer shaft $A_1$ of the steering shaft A and the inner shaft accommodating portion 13 for accommodating the inner shaft $A_2$ thereof, the molten-resin injection guide portion 14 communicating with the opening 1a of the outer shaft $A_1$ being formed in the inner shaft accommodating portion 13. Consequently, it is possible to form the coupling and sliding section $A_3$ of the steering shaft A very easily and efficiently.

To give a more detailed description of the advantages of the apparatus for manufacturing a steering wheel, when the molten resin is allowed to flow through the injection port of the mold C, the molten resin flows through the molten-resin injection guide portion 14 and is directed to the opening 1a of the outer shaft $A_1$, and is filled substantially uniformly on the inner periphery of the outer shaft $A_1$. Hence, the axial positions of the outer shaft $A_1$ and the inner shaft $A_2$ are made substantially concentric with each other, thereby making it possible to form the coupling and sliding section $A_3$ which undergoes favorable sliding movement during receipt of an impact.

What is claimed is:

1. An apparatus for manufacturing a steering shaft, comprising:

a mold including an outer shaft supporting mold portion to accommodate an outer shaft of said steering shaft, and an inner shaft supporting mold portion to accommodate an inner shaft of said steering shaft, said outer shaft supporting mold portion including a first molten resin injection guide portion being positioned in alignment with a hole formed in the outer shaft and a circumferential groove in the inner shaft to enable injection of resin through the hole into the groove; said inner shaft supporting mold portion including a second molten resin injection guide portion communicating with a first opening formed between said outer shaft and said inner shaft to enable injection of resin into said first opening.

2. The apparatus of claim 1, wherein said outer shaft supporting mold portion includes an annular stop surface against which one end of said outer shaft is positionable to align the first molten resin injection guide portion with said hole.

3. The apparatus of claim 2, wherein said outer shaft supporting mold portion includes a larger diameter mold cavity and said inner shaft supporting mold portion includes a substantially coaxial, longitudinally spaced smaller diameter mold cavity.

4. The apparatus of claim 1, wherein said outer shaft and inner shaft supporting mold portions are of different diameter to form a stepped portion.

5. The apparatus of claim 4, wherein one end of said outer shaft is adapted to abut against the step to position the outer shaft in proper alignment with the first molten resin guide portion.

6. The apparatus of claim 1, wherein said first opening is an annular gap formed between the inner and outer shafts at one end of said outer shaft.

7. The apparatus of claim 1, wherein said circumferential groove is an annular groove.

8. The apparatus of claim 1, wherein said outer and inner shaft supporting mold portions are arranged to hold the inner and outer shafts in a substantially concentric relationship.

* * * * *